United States Patent Office

3,123,635
Patented Mar. 3, 1964

3,123,635
AGITATION OF ADIPIC ACID CRYSTALS TO STABILIZE THE SIZE THEREOF
Nicholas D. Pintauro, New City, and Oscar R. Friedemann, Yonkers, N.Y., assignors to General Foods Corporation, White Plains, N.Y., a corporation of Delaware
No Drawing. Filed Nov. 14, 1960, Ser. No. 68,588
2 Claims. (Cl. 260—537)

This invention relates to a method of preparing adipic acid. More specifically, it relates to a technique for obtaining adipic acid of desired particle size.

As is apparent to those skilled-in-the-art, adipic acid has been known chemically for many years. However, its commercial production only dates back to about 1935; prior to that time adipic acid was little more than a laboratory curiosity. Substantially the entire output of adipic acid from 1935 has been consumed in chemical processes, most commonly in the manufacture of nylon-type materials, but also in the manufacture of esters for use in plastics, etc. In such processes, the adipic acid which comes off the production line may be used directly in the ensuing chemical process or it may in due course be combined with other chemicals for further treatment. The chemical properties of adipic acid are primarily important, and the physical properties are not as important. Accordingly, little consideration has been given to the physical properties of adipic acid, i.e., handleability, crystal structure, particle size, changes during storage, etc. In fact, because of the almost complete absence of any substantial physical use of adipic acid in dry crystal form or in mixtures with other dry ingredients, very little has become known about the practical every-day physical properties of adipic acid which bear upon its handleability.

Although adipic acid may be made by several processes, e.g., the oxidation of benzene, in these processes, the last step prior to shipping, is commonly a crystallizing operation. Here the crude adipic acid crystals are dissolved in aqueous solution and after the solution is subjected to appropriate clarification, filtration, etc., the acid is crystallized. The crystallized adipic acid may then be separated from the mother liquor by well-known means and subsequently dried, for example, in a tunnel drier to give the adipic acid product of commerce.

If an ultimate use necessitates classification of the adipic acid to a given particle size or to a particle size distribution, this has generally been effected by classifying or screening immediately after the crystals are dried. This commonly occurs within a very short time after the crystals have been produced.

There are certain proposed uses of adipic acid wherein the adipic acid can be considered as a substitute for certain other acids which have heretofore been employed, e.g., citric acid. Typical of such uses is the use of adipic acid in gelatin desserts, q.v. U.S.P. 2,657,996 to Ferguson. In specifying the properties of the adipic acid and in particular the particle size distribution, it has been universally believed that it is desirable to set up the specification so that the adipic acid is specified to be of the same particle size as has heretofore been found necessary for the other acids, e.g., citric acid. Such a specification, for example, might call for a maximum of 30% through a 100-mesh screen and substantially 100% through a 40-mesh screen.

It has been commonly believed that this specification is readily enough complied with, and in ordering material from the manufacturer, he has been requested to follow this specification. The manufacturer accordingly has classified and screened freshly prepared adipic acid to meet this particle size specification. The so-classified, specially prepared adipic acid has then commonly been bagged and forwarded to the consumer.

Because of the normal delays inherent in shipping and the desirability of building up an inventory on the premises, the user may store the adipic acid for a period of time ranging from 3–5 days to 2 weeks or longer. The stored adipic acid may then be subjected to screen analysis just prior to use to insure that material possessed the desired particle size.

Unsuspectedly, it has been found that the adipic acid which had been previously classified to desired particle size, no longer meets the specification. More specifically, it may be found that the particle size distribution is random and that the amount of fines has increased spectacularly. On one occasion, for example, the proportion of adipic acid passing through a 100-mesh screen had increased from about 17% to about 66%. On further study, it became apparent that all of the material which had met the specifications at the manufacturer's plant was non-specification material at the point of use, despite the fact that the handling of the acid had been rather mild, and there was no a priori reason to believe that the change in particle size could have been effected as a result of abusive handling or inordinate changes in humidity, temperature, etc. A change of this magnitude may not have heretofore been thought to be objectionable for certain chemical uses; however, this change was so great that the resulting acid was considered unsatisfactory in view of the known standards which have heretofore been commonly accepted by those skilled-in-the-art of preparing physical formulations typified by dessert powders.

Although there may be physical-type uses for adipic acid wherein it may be possible to employ adipic acid of random particle size distribution, it is desirable under some conditions to control the particular particle size distribution.

It is an object of this invention to provide a technique for obtaining adipic acid particles of desired particle size. Other objects will be apparent to those skilled-in-the-art on inspection of the following description.

It has now been unexpectedly found that freshly crystallized adipic acid may be characterized by a particulate or crystal instability. Although it is not possible to state precisely why this is so, it appears that when adipic acid crystals are freshly prepared, they are characterized by some internal strain, possibly of an electrostatic nature. Because of this, freshly prepared adipic acid crystals undergo a radical internal change even when stored under controlled equilibrium conditions at constant temperature, constant humidity, etc.; and as a result of this completely unexpected phenomenon, the crystals disintegrate, shatter, deaggregate, deagglomerate, etc., and the average particle size decreases considerably in a manner of days. Under plant conditions wherein adipic acid may be stored in packages or upon containers, this crystal deterioration may occur more quickly.

In accordance with certain aspects of this invention, it is possible to prepare an adipic acid of predetermined particle size by the process which comprises crystallizing said adipic acid crystals, impacting said crystallized adipic acid crystals, and classifying said impacted adipic acid crystals.

Crystallization of adipic acid may be effected by dissolution of the crude material in appropriate solvents, typically water, and then by heating with agitation until complete solution is effected. The adipic acid solution may then be clarified by passage through a bed of charcoal, or otherwise filtered to give a liquor which is substantially transparent and clear. Adipic acid crystals may be recovered from this liquor by evaporation of liquid therefrom under controlled conditions in a crystallizer. Typically this may include maintaining the mother liquor under controlled conditions including concentration of pressure, temperature, and time. Under the conditions prevailing within the evaporator, adipic acid crystals may be precipitated. It is preferred that the so-precipitated crystals be passed to an appropriate crystal reservoir from which they may be removed from the system. Preferably the so-formed crystals may be drained of mother liquor and dried.

It is preferred to pass the crystals through a tunnel dryer wherein warm forced air removes last traces of moisture from the crystal. The product adipic acid may contain very small amounts of water, typically approaching 0%; and the purity of the material may also approach 100% adipic acid.

The adipic acid product which leaves the drier may be in the form of individual crystals; more commonly it will be in the form of aggregates, clusters, or agglomerates, wherein individual crystals may be bonded together by forces including internal bonds possibly of an electrostatic nature.

The so-prepared crystal agglomerates of adipic acid may be treated in accordance with this invention by subjecting them to impacting.

Impacting, as the term is used in this invention, includes the application to the crystal agglomerates of energy in the form of kinetic energy and converting this energy into energy of deagglomeration-stabilization. This conversion may be effected by permitting the agglomerates to move in one direction and suddenly changing the direction of motion of the agglomerates, during which operation, the agglomerates strike each other. Typically, impacting may be accomplished by applying an impacting force to vigorously permit contacting one crystal agglomerate with another crystal agglomerate. In practice of the invention, impacting may be effected by shaking preferably a body of crystals under conditions such that each crystal agglomerate is permitted to move freely, whereby it may encounter other crystal agglomerates or the wall of the vessel which contains the crystal agglomerates or body of crystal agglomerates.

Such impacting permits breakdown of the crystal agglomerate structure of the adipic acid to provide a mixture of crystal particles which upon further treatment by shaking are not broken down further.

Impacting may preferably be effected during shaking, and more preferably, it may be effected during a shaking-screening or classification operation. Typically impacting may be effected in a vibrating classifier or in a series of vibrating screens. Typically such an apparatus may be the Ro-Tap apparatus (manufactured by W. S. Tyler Co.) wherein a series of screens are mounted one above the other in a closed system which is simultaneously vibrated or shaken and intermittently tapped or hit by a hammer.

It has been found that as the body of adipic acid crystal agglomerates are impacted as by Ro-tapping, substantially little or no change occurs during the first few minutes of impacting. A typical sample withdrawn five minutes after impacting has started, may be found to have substantailly the same particle size distribution as did the raw material at zero time.

It is found that if the impacting operation be continued for a period of at least about 15 minutes, and preferably about 20 minutes or longer, the crystal agglomerates will be substantially stabilized to the point at which further impacting will not produce any substantial change in the particle size distribution. It is a feature of this invention that impacting of the particles over a period of time as short as 15–20 minutes permits attainment of a stabilized adipic acid, which upon further standing will undergo no additional change resulting from the peculiar nature of the adipic acid particle agglomerate. In one series of comparative runs, an adipic acid mass having a particle size distribution of approximately 66% greater than 100 mesh, and 34% smaller than 100 mesh was impacted for approximately 20 minutes; it was then found to have a particle size distribution such that 37% was greater than 100 mesh and 63% was smaller than 100 mesh. Further standing for an extended period of time; typically 30 days or more, under controlled conditions, produced substantially no additional change in particle size.

It is a particular feature of applicants' novel invention that it is possible to produce a stabilized adipic acid within a brief period of time, e.g., 15–20 minutes, and that this stabilized adipic acid may possess all the desirable characteristics of adipic acid which has been stabilized by the process of applicants' co-pending application, Serial No. 34,887, filed June 9, 1960, in which the total time was typically about 8–10 days.

In accordance with one specific embodiment of this invention, a freshly prepared commercial adipic acid which was recovered from a crystallization operation may be subjected to a screen analysis. The analysis of this material can be effected by microscopic means, i.e., selected samples of this material may be viewed through a microscope, fitted with a slide containing a measurement grid thereon, and individual particles counted and graded as to size. The particle size distribution of this material may be as follows.

TABLE I

| Screen mesh: | Percent retained |
|---|---|
| 40 | 0.25 |
| 80 | 61.00 |
| 100 | 4.50 |
| 140 | 28.50 |
| 200 | 2.50 |
| In the pan | 3.25 |

A separate sample of the same material was placed within the upper portion of a Ro-Tap, a series of screens mounted one above the other above a lower plane and fitted with a knocker which imparted to the screens an impact 150–160 times per minute. The vibrator of the Ro-Tap which moved the screens in a horizontal plane over a displacement of about 0.5 inch, 150–160 times per minute, was turned on.

The classification and tapping was continued for five minutes. At the end of this time the material on each of the screens was weighed and the particle size distribution may be as follows.

TABLE II

| Screen mesh: | Percent retained |
|---|---|
| 40 | 0.25 |
| 80 | 61.00 |
| 100 | 4.50 |
| 140 | 28.50 |
| 200 | 2.50 |
| In the pan | 3.25 |

It would be noted that Table II is substantially the same as Table I, and that accordingly impacting for five minutes does not permit attainment of any significant change.

Impacting was continued in a separate but identical sample for 20 minutes, and at the end of this time the amount of material on each of the several screens was weighed. The results are shown in Table III.

TABLE III

| Screen mesh: | Percent retained |
|---|---|
| 40 | Trace |
| 80 | 6.75 |
| 100 | 30.50 |
| 140 | 49.50 |
| 200 | 7.00 |
| In the pan | 6.25 |

As may be noted from inspection of Table III, the particle size distribution of the adipic acid which has been impacted for 20 minutes has been considerably modified. The particle size distribution after 20 minutes is such that 37.25% of the material is greater than 100-mesh, whereas after five minutes 65.75% of the material was greater than 100-mesh. Furthermore, after 20 minutes of shaking, 62.75% of the material was found to be smaller than 100-mesh while 34.25% of the material fell within this size grouping prior to shaking.

Accordingly, it will be noted that the adipic acid particles had substantially decreased in size during the 20 minutes of shaking or impacting.

A sample of the batch of fresh material used for the test summarized in Table III was permitted to stand for 26 days, and at the end of that time, its particle size distribution was determined by shaking for five minutes in the Ro-Tap shaker. The results of this determination are shown in Table IV.

TABLE IV

| Screen mesh: | Percent retained |
|---|---|
| 40 | 0.50 |
| 80 | 6.00 |
| 100 | 26.00 |
| 140 | 34.00 |
| 200 | 6.00 |
| In the pan | 27.50 |

It was noted that in the 26th day period the particle size distribution was only slightly different from that of Table III. The percent of particles greater than 100-mesh had dropped slightly from 37.25% to 32.5% and the percent of particles smaller than 100-mesh had increased slightly from 62.75% up to 67.5%. Thus it may be observed that impacting for a period of about 20 minues permitted attainment of a product which was substantially the same as one which had been permitted to stand for 26 days.

By way of comparison, a sample of the material of Table III, supra, was permitted to stand for 26 days. At the end of that period, it was subjected to a screen analysis in a Ro-Tap classification device employing a shaking time of 20 minutes. The analysis of the so-treated material was essentially the same as that of Table IV indicating that no further deagglomeration occurs by impacting adipic acid stabilized by 26 days' standing.

The stabilization by impacting of adipic acid in accordance with this invention is a completely unexpected finding. If an acid, e.g., citric acid, which has heretofore been used in similar compositions be treated by impacting, it will be observed that substantially no change in particle size is effected. In one series of comparative experiments, samples containing 100 parts of freshly manufactured citric acid were classified immediately after manufacture to give a body wherein the particle size distribution was 100% through 30-mesh and 100% on 100-mesh. Each of the samples was placed in a Ro-Tap wherein it was impacted on screens for a period of either five minutes or twenty minutes. At the end of this period, the portions of acid on each screen and in the pan were measured. The results were as follows:

TABLE V

*Citric Acid*

| Screen Mesh | 5 Minutes | 20 Minutes |
|---|---|---|
| 40 | 0.5 | Trace |
| 80 | 92.5 | 92.0 |
| 100 | 6. | 6.5 |
| 140 | 0.5 | 0.5 |
| 200 | Trace | Trace |
| In the pan | 0 | Trace |

From the above table, it will be apparent that the citric acid particle size distribution remained unchanged during the impacting—the particle size distribution after said 20 minutes was the same as that at the start of impacting.

Adipic acid which has been treated in accordance with the technique of this invention may find use in the preparation of gelatin desserts. Other uses will be apparent to those skilled-in-the-art.

Although this invention has been described with reference to certain specific embodiments, it will be apparent to those skilled-in-the-art that various modifications and changes may be made thereto. This application is a continuation-in-part of application Serial 34,887, filed June 9, 1960, of the same inventors, entitled, "Method of Preparing Adipic Acid."

What is claimed is:

1. A method of preparing stable adipic acid crystals which comprises forming a body of adipic acid crystals, said crystals having a particle size wherein about 17–34% of fines pass through a 100 mesh screen; shaking said crystals by means of mechanical vibrations to cause said crystals to strike each other thereby reducing the average crystal particle size to a degree wherein 63–66% of the crystals pass a 100 mesh screen, said agitated adipic acid crystals undergoing substantially no further change in particle size; and classifying said stabilized adipic acid crystals according to particle size.

2. The method claimed in claim 1 in which said adipic acid crystals are shaken for at least 15 to 20 minutes.

References Cited in the file of this patent

Perry et al.: "Chemical Engineer's Handbook" (1950), pages 955–964.

Du Pont: "Adipic Acid and its Derivatives" (1957), pages 33 and 52.